United States Patent [19]

Waldman et al.

[11] 4,275,041

[45] Jun. 23, 1981

[54] PROCESS FOR MANUFACTURING A STABLE TITANYL SULFATE SOLUTION

[75] Inventors: Joseph L. Waldman, Elizabeth, N.J.; Edgar Klein, Odenthal-Osenau; Achim Kulling, Leverkusen, both of Fed. Rep. of Germany; Joseph A. Rahm, Long Branch, N.J.

[73] Assignee: NL Industries, Inc., New York, N.Y.

[21] Appl. No.: 188,805

[22] Filed: Sep. 19, 1980

[51] Int. Cl.$^3$ .................. C01G 23/053; C01G 23/00
[52] U.S. Cl. ........................................ 423/82; 423/83; 423/85; 423/86; 75/1 T
[58] Field of Search ............... 423/69, 82, 83, 85, 423/86; 75/1 T

[56] References Cited

U.S. PATENT DOCUMENTS

| | | | |
|---|---|---|---|
| 1,338,473 | 4/1920 | Wrigley et al. | 423/83 |
| 1,504,669 | 8/1924 | Blumenfeld | 106/300 |
| 1,504,670 | 8/1924 | Blumenfeld | 423/85 |
| 1,504,671 | 8/1924 | Blumenfeld | 106/300 |
| 2,617,724 | 11/1952 | Espenschied | 423/82 |
| 3,071,439 | 1/1963 | Solomka | 423/610 |
| 3,647,414 | 3/1972 | Nilsen | 423/83 |
| 3,760,058 | 9/1973 | Langmesser et al. | 423/85 |
| 3,784,670 | 1/1974 | Yamada et al. | 423/82 |

*Primary Examiner*—Herbert T. Carter
*Attorney, Agent, or Firm*—Gary M. Nath; Eugene Striffler

[57] ABSTRACT

A process is provided for the manufacture of a stable titanyl sulfate solution by diluting a reaction mixture containing iron sulfate and titanyl sulfate with a material selected from water, a titanyl sulfate solution, and mixtures thereof. The titanyl sulfate solution may be recovered or processed to provide titanium dioxide hydrate which may be calcined to provide titanium dioxide pigment.

8 Claims, 1 Drawing Figure

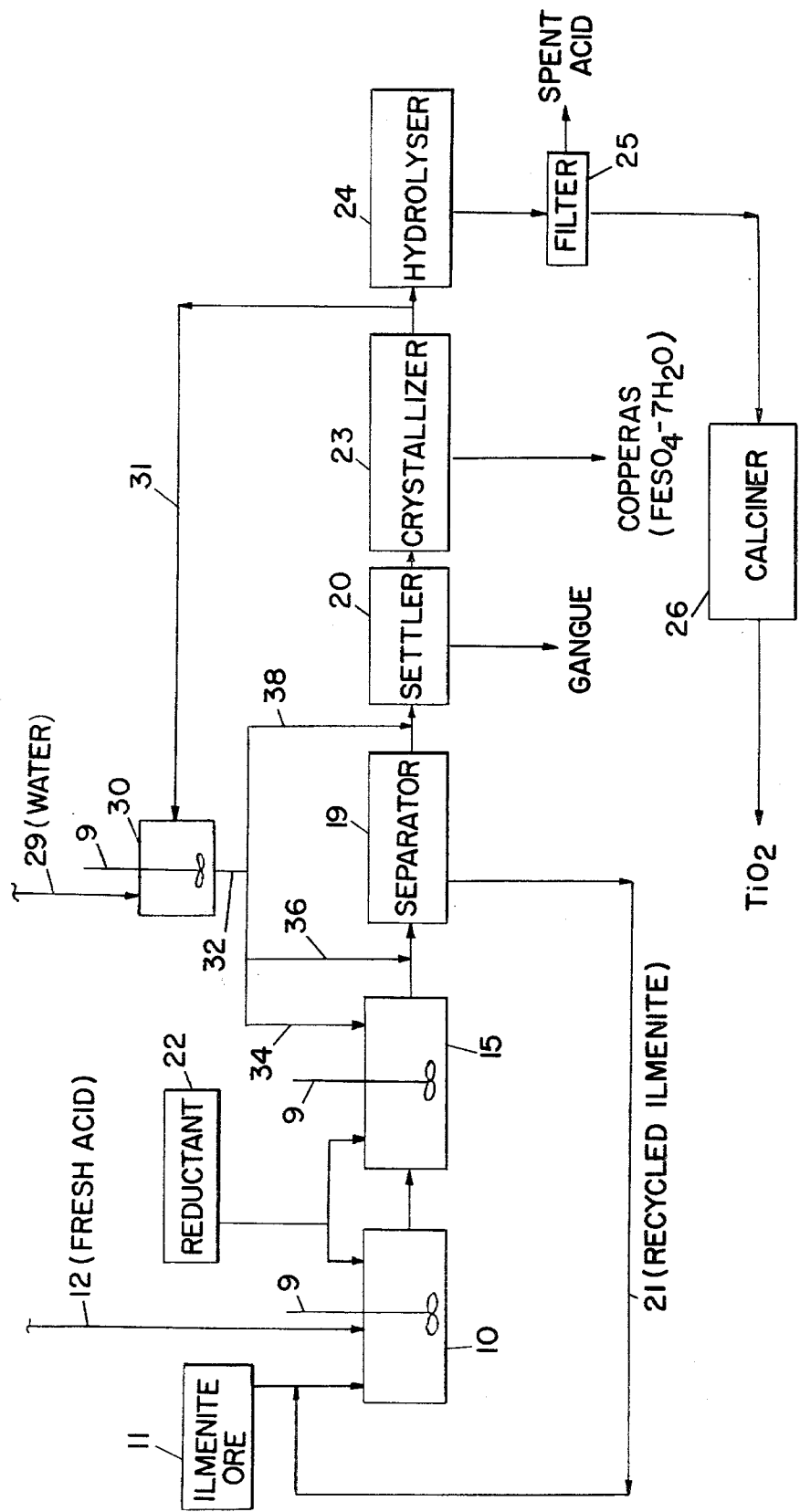

PROCESS FOR MANUFACTURING A STABLE TITANYL SULFATE SOLUTION

The present invention relates to the manufacture of a stable titanyl sulfate solution. More particularly, the present invention is directed to a process for treating a reaction mixture prepared from the reaction of a titaniferous bearing material and dilute sulfuric acid with a diluent selected from water, titanyl sulfate solution and mixtures thereof.

Titanium dioxide is a well known material having desirable pigment properties which is useful in paint and coating compositions and in plastics materials. Several different processes are known for manufacturing titanium dioxide material including, for example, the sulfate process and the chloride process. The present invention primarily concerns the manufacture of titanium compounds and particularly titanium dioxide by a sulfate process.

In the conventional sulfate process for the manufacture of titanium compounds, titanium bearing material such as ilmenite ore which includes massive ilmenite, ilmenite sands and titaniferous or furnace slag are reacted with concentrated sulfuric acid (e.g., 90%–90% sulfuric acid). The reaction is sometimes referred to as "digestion" or "ore digestion." The digestion reaction of the titaniferous material and concentrated sulfuric acid is exothermic in nature and proceeds very violently. Typically, the titaniferous material and the concentrated sulfuric acid are placed in a reaction vessel called a digestion tank. Water or steam is usually added to the digestion tank to initiate and accelerate the acid-ore reaction. The large quantity of heat generated by the exothermic reaction results in a vigorous boiling action of the water-acid solution at about 100° C. to about 190° C. and the release of vast quantities of steam and vapor having entrained particulate material. As the violent reaction proceeds, water is expelled and the reaction mass becomes solid; the reaction is completed in the solid phase at a temperature of approximately 180° C. to 210° C. The solid reaction mass, referred to as a "cake," is allowed to cool. Thereafter, the solid cake is dissolved with water or dilute acid to provide a solution of sulfate salts of iron, titanium and other trace metals present in the titaniferous material. The digestion operation is a batch procedure carried out in a single digestion tank. As many digestion tanks are used as necessary according to the desired capacity of the manufacturing plant to prepare a titanyl sulfate solution.

After digestion, the resulting sulfate salt solution (containing iron and titanium salts) is further processed by known measures to remove the ferrous sulfate, usually referred to as "copperas," to provide a solution of titanyl sulfate which, upon hydrolysis, yields hydrated titanium dioxide. The titanium dioxide hydrate is usually subjected to a calcination treatment in a suitable kiln device to remove the water of hydration and to provide the anhydrous titanium dioxide pigment. The foregoing process is described in greater detail in, for example, U.S. Pat. Nos. 1,504,672; 3,615,204 and 3,071,439.

When domestic ilmenite ores with high iron contents are digested and the solid reaction mass dissolved, large quantities of iron are carried into the sulfate salt solution. The excessive amount of iron carried into solution from domestic ores and resulting concomitant decrease in titanium content may result in an unstable sulfate salt solution undesirably low in free sulfuric acid content. Such solutions tend to develop premature hydrolysis or become "active" by reason of the formation and presence therein of "nuclei" sometimes called colloidally dispersed slimes. The presence of these nuclei in the subsequent hydrolysis step will impair the quality of titanium dioxide pigment made from those solutions.

U.S. Pat. No. 2,413,641 discloses a method to raise the active sulfuric acid content in the dissolution stage of the process, thereby limiting the formation of nuclei. The method also allows for improved control of the active acid to soluble titanium ratio. The method controls the composition of the sulfate salt solution formed when the solid reaction mass is dissolved by recycling titanyl sulfate solution obtained after removal of ferrous sulfate to the dissolving stage.

The aforementioned difficulties have been partially overcome by use of a liquid phase digestion process such as that set forth in copending application Ser. No. 65,450 wherein the formation of nuclei is regulated because the free sulfuric acid content can be readily controlled throughout the process. The liquid phase digestion process does not form a solid reaction mass or cake during digestion; that is, the titanyl sulfate product remains soluble throughout the entire digestion reaction. This digestion process improves process control of the digestion solution prior to the hydrolysis stage and thus allows the titanium concentration in the reaction mixture to be increased significantly higher than possible by conventional sulfate processing techniques without the aforementioned undesirable effects. At higher sulfate salt concentrations the solubility of ferrous sulfate is decreased, especially when high iron content ilmenite ores are used. Increasing the titanyl sulfate concentration in the reaction mixture, however, results in a simultaneous increase in precipitated ferrous sulfate. For example, ferrous sulfate is the least soluble salt present in a reaction mixture having an acid concentration of less than 30 weight percent. Therefore, at higher titanium concentrations, such as at the saturation limit, the titanyl sulfate concentration may be increased at the expense of precipitating ferrous sulfate monohydrate. As used herein, the term sulfate salt refers to salts of the sulfate ion present in the reaction mixture, such as titanyl sulfate, sulfuric acid, and ferrous sulfate.

It should be noted that the ferrous sulphate precipitates out of solution as ferrous sulphate monohydrate crystallites. The presence of the crystallites in the reaction mixture makes separation of unreacted ore and gangue material very different. The high concentration of sulphate salts and the presence of ferrous sulphate mononhydrate crystallites combine to give a reaction mixture with hindered settling, high viscosity, and high density. These conditions result in an increased volume of gangue material due to the presence of large quantities of ferrous sulfate monohydrate crystallites, titanyl sulfate, and free sulfuric acid in the gangue. The loss of these valuable materials is not only costly, but adds to the pollution problems associated with gangue disposal.

Accordingly, the present invention provides a process for preparing a titanyl sulfate solution that substantially avoids or reduces the drawbacks mentioned hereinabove of the liquid phase digestion sulfate process while avoiding the difficulties associated with conventional sulfate techniques.

According to the present invention, there is provided a process for preparing a stable titanyl sulfate solution, which comprises:

(1) reacting a titaniferous bearing material in an amount between about 10% and about 400% above the stoichiometric amount of material necessary to react with sulfuric acid to provide titanyl sulfate with a dilute sulfuric acid solution having a concentration between about 25% and about 60% by weight, based upon the total weight of said solution, at a temperature below about 140° C.;

(2) cooling the resulting reaction mixture to a temperature below about 110° C. without precipitating titanyl sulfate to produce a reaction mixture containing dissolved titanyl sulfate;

(3) diluting the reaction mixture containing titanyl sulfate with a sufficient amount of a diluent material selected from the group consisting of water, titanyl sulfate solution, and mixtures thereof, to produce a reaction mixture having the following properties in the absence of undissolved solids; an iron to titanium dioxide weight ratio of about 0.5–1.2:1.0, a titanium dioxide content of about 120 to about 180 grams per liter, a specific gravity between about 1.4 and about 1.8, and an active sulfuric acid to titanium dioxide mole ratio of about 1.4–1.9:1;

(4) separating undissolved solids and obtaining a stable titanyl sulfate solution.

In another embodiment, the present invention provides a process for producing titanium dioxide from a titanyl sulfate solution which comprises:

(1) reacting a titaniferous bearing material in an amount between about 10% and about 400% above the stoichiometric amount of titaniferous bearing material necessary to react with sulfuric acid to provide titanyl sulfate with a dilute sulfuric acid solution having a concentration between about 25% and about 60% by weight, based upon the total weight of said solution, at a temperature below about 140° C.;

(2) cooling the resulting reaction mixture to a temperature below about 110° C. without precipitating titanyl sulfate to produce a reaction mixture containing soluble titanyl sulfate;

(3) diluting the reaction mixture containing titanyl sulfate with a sufficient amount of a diluent material selected from the group consisting of water, titanyl sulfate solution, and mixtures thereof, to produce a reaction mixture having the following properties in the absence of undissolved solids; an iron to titanium dioxide weight ratio of about 0.7–1.1:1.0, a titanium dioxide content of about 120 to about 180 grams per liter, a specific gravity of about 1.4 to about 1.8, and an active sulfuric acid to titanium dioxide mole ratio of about 1.4–1.9:1.0;

(4) separating undissolved solids from the reaction mixture to provide a solution of iron sulfate and titanyl sulfate;

(5) removing iron sulfate from said solution of iron sulfate and titanyl sulfate to produce a solution of titanyl sulfate;

(6) hydrolyzing said titanyl sulfate to provide a titanium dioxide hydrate, and spent sulfuric acid solution;

(7) calcining said titanium dioxide hydrate to provide titanium dioxide; and (8) recovering titanium dioxide.

The Drawing depicts a schematic flow diagram of an embodiment of the inventive process describing one method for carrying out the digestion of the titaniferous bearing materials while limiting the precipitation of ferrous sulfate monohydrate to prepare titanium dioxide.

The digestion reaction is conducted with a titaniferous bearing material. As used herein, the term titaniferous bearing material means a material containing recoverable titanium values when treated according to the process of the invention. Exemplary materials include titaniferous slag, furnace slag, ilmenite ores such as magnetic ilmenite and massive ilmenite and ilmenite sands.

The digestion reaction is conducted with a sufficient amount of the titaniferous bearing material to provide an excess of said material in an amount between about 10% and about 400% above the stoichiometric amount. The following formula depicts the stoichiometry of the digestion reaction:

$$FeTiO_3 + 2H_2SO_4 \rightarrow TiOSO_4 + FeSO_4 + 2H_2O$$

The use of excess titaniferous bearing material in the digestion reaction is effective and desirable for achieving a successful and workable process according to the present invention without the need for excessive grinding of the ore. As indicated hereinabove, an excess of titaniferous bearing material between about 10% and about 400% above the stoichiometric amount necessary for reacting with sulfuric acid, should be employed in the digestion reaction of the process. The use of lesser amounts results in unacceptably low reaction rates and long processing times so that the process becomes economically unattractive. Using amounts of excess material higher than recommended is undesirable due to greatly reduced fluidity of the reaction mixture and the need to recycle large quantities of unreacted titaniferous bearing material and adhering solution to the digestion reactors. It should be recognized that reaction rates will vary with the source of titaniferous material employed during digestion.

The sulfuric acid utilized in the process of the invention should have a concentration of between about 25% and about 60% by weight, based upon the total weight of the acid solution. An acid concentration below about 25% by weight is not desirable because hydrolysis of the titanyl sulfate occurs during and in conjunction with the digestion reaction when using such acids. Utilizing an acid concentration greater than about 60% by weight is not desirable because: (1) the resulting reaction solution is more viscous and difficult to handle, (2) the economics of recycling spent acid are not realized unless the spent acid is concentrated, which unnecessarily increases the cost of operation, (3) the higher concentration of reaction products in solution promotes the precipitation of ferrous sulfate monohydrate which is difficult to remove by filtration, and (4) favors precipitation of $TiOSO_4.2H_2O$.

When operating the digestion process at the upper limit of solubility to maximize titanyl sulfate concentration in the reaction mixture, a certain quantity of ferrous sulfate monohydrate is usually precipitated during the digestion reaction without any significant deterioration in the fluidity of the reaction mixture. It has been discovered that the solubility of the ferrous sulfate monohydrate is a function of the total amount of sulfate salts present in the reaction solution, represented by the sum of the concentration of titanyl sulfate, measured as $TiO_2$, total sulfuric acid, and ferrous sulfate. The sum of the concentration of these three species have an upper limit of solubility of about 50–55 weight percent. Titanyl sulfate and sulfuric acid have a greater solubility than ferrous sulfate. Therefore, in a saturated solution containing titanyl sulfate, sulfuric acid, and ferrous sulfate when either the concentration of titanyl sulfate or sulfuric acid are increased in the reaction solution, the solubility of ferrous sulfate decreases. This results in the precipitation of ferrous sulfate as ferrous sulfate monohydrate in a quantity equal to the amount exceeding the upper limit of solubility.

It has been discovered that ferrous sulfate monohydrate may be dissolved by diluting the ferrous sulfate concentration in the reaction solution by the addition of water, a titanium sulfate solution, or mixtures thereof, to the reaction mixture. The amount of diluent material required for dissolution of the ferrous sulfate monohydrate crystallites depends upon the soluble iron sulfate content of the diluent material, the degree to which one may desire to limit the amount of precipitated ferrous sulfate monohydrate, and the total amount of soluble sulfate salts in the reaction mixture and the diluent material. Generally, the higher the soluble ferrous sulfate and soluble sulfate salt content, the greater the amount of diluent material required to dissolve the ferrous sulfate monohydrate crystallites. The amount of diluent materials required for suitable dissolution of ferrous sulfate monohydrate will vary with the results desired and can readily be found without undue experimentation. It is not critical to add an amount of diluent material to dissolve all the precipitated ferrous sulfate monohydrate, it is only critical to add an amount sufficient to dissolve enough ferrous sulfate monohydrate to allow efficient separation of unreacted titaniferous bearing material.

Water is the most efficient diluent material in limiting the precipitation of ferrous sulfate monohydrate. A lesser amount of water by weight is required to solubilize the monohydrate crystallites than any of the other recited diluent materials. The use of water, however, may be disadvantageous, in that much of the water added must be removed by concentration at a subsequent stage in the process to allow for an efficient hydrolysis reaction.

When a titanyl sulfate solution is employed for the dilution, it is preferable to use a titanyl sulfate solution substantially free of ferrous sulfate. However, when producing titanium dioxide, the preferred titanyl sulfate solution is one recycled from a subsequent step of the process which is separated from the iron sulfate following crystallization but prior to hydrolysis of the said titanyl sulfate. The recycled titanyl sulfate solution should have a weight ratio of iron to titanium dioxide less than the reaction mixture with a preferred solution having a weight ratio of iron to titanium dioxide less than 0.4:1.0. Generally, the less iron in the recycled solution the greater its efficiency in solubilizing the ferrous sulfate monohydrate crystallites in the reaction mixture. A portion of the reaction solution, particularly that obtained immediately after crystallizing ferrous sulfate heptahydrate from the titanyl sulfate solution is recycled to an earlier stage in the process and blended with the reaction mixture before separation of the undissolved solids.

The titanyl sulfate content measured as $TiO_2$ in the diluent titanyl sulfate solution should range between about 140 and about 200 grams per liter and preferably between about 160 and about 180 grams per liter. Its iron content should be less than 40 parts per 100 parts of titanyl sulfate (measured as $TiO_2$), and preferably ranges from about 25 to 35 parts by weight for each 100 parts of titanyl sulfate (measured as $TiO_2$) in solution.

This low iron content is necessary to assure efficient solubilization of the precipitated ferrous sulfate monohydrate. Generally, the more titanyl sulfate solution recycled, the less effective an additional quantity of a titanyl sulfate solution will be in preventing the precipitation of ferrous sulfate monohydrate. The amount of recycled titanyl sulfate solution is preferably less than or equal to the weight of the reaction mixture. It will generally take two or more times the reaction mixture weight of the titanyl sulfate solution to totally prevent the precipitation of ferrous sulfate monohydrate, depending on the iron and titanium concentration in the recycle solution.

Another method of dilution is to use a mixture of water and a titanyl sulfate solution. The titanyl sulfate solution being preferably recycled from a subsequent step of the process such as described above. By using a combination of water and titanyl sulfate solution, the most beneficial effects of the water and titanyl sulfate solution diluents may be utilized. The water addition dissolves the largest amount of ferrous sulphate monohydrate, but the weight of water employed is limited by the supplemental addition of titanyl sulfate, thereby minimizing the need for a separate concentration step later in the process. In addition, the titanyl sulfate addition dissolves some ferrous sulfate monohydrate, but acts as a buffer for the soluble titanium concentration, i.e., limits the effects of the water addition upon dilution of the soluble titanium values.

A secondary, but no less important effect of the dilution is the reduction in the specific gravity of the reaction mixture. Since specific gravity depends on the concentration of dissolved salts and acid, the combination of the reaction mixture with the diluent materials having a lower specific gravity results in an overall effect of lowering the specific gravity of the diluted reaction mixture.

Separation of undissolved solids is more readily accomplished in solutions of low specific gravity. A solution having a specific gravity too low will have deleterious effects in subsequent process stages. Conversely, solutions with high specific gravities are very difficult to clarify of undissolved solids and this difficulty increases rapidly with an increase in concentration. It is desirable to work with solutions having a specific gravity between 1.4 and 1.8. The preferred range of specific gravity is between 1.4 and 1.6. Additionally, due to the high salt concentration of the process solutions the temperature of the solutions should be maintained significantly above the saturation temperature to prevent excessive precipitation of ferrous sulfate monohydrate. The saturation temperature being the temperature at which a given solution containing a dissolved salt will dissolve no more salt. For example, the dissolution of ferrous sulfate monohydrate works well at temperatures between about 50° C. and about 70° C.

It is not critical at what stage in the process the dilution is made as long as it is prior to removal of the undissolved solids from the reaction mixture. Generally, it is preferred not to add any diluent materials in the first stage reactor when using a multi-stage digestion process because of the adverse effects it will have on the reaction rate. Addition of diluent materials to other reactor stages relieves the aforementioned prior art problems associated with undissolved solids removal and ferrous sulfate monohydrate crystallites, and assists in temperature control. In a batch reaction, dilution is preferably performed while cooling the reaction mixture below 110° C.

When the dilution is made after digestion but prior to removal of the undissolved solids it will significantly relieve problems in the solids separation operation, e.g., settling and filtration. The dilution results in increased settling rates, decreased viscosity and density, prevents blinding of the filter cloth by the fine crystallites, decreases the volume of gangue material for disposal, and decreases capital expenditures for installation of the new process by allowing the use of equipment currently available in conventional sulfate process operations.

The stability of the reaction mixture to hydrolysis is a function of acid and water concentration, and temperature. Generally, the greater the water concentration and temperature and the lower the free acid concentration, the less hydrolytically stable the solution. Conversely, the stability of a dilute reaction mixture to hydrolysis is increased by lowering the temperature of the mixture. It has been found that the addition of a hot diluent material to the reaction mixture creates a localized instability leading to hydrolysis and the formation of nuclei. When the dilution addition is made and the temperature of the diluent material is less than the temperature of the reaction mixture, the formation of nuclei is greatly reduced. Therefore, a salient feature of the inventive process is to perform a dilution with the diluent material at a temperature less than the temperature of the reaction mixture to inhibit hydrolytic nucleation of the titanyl sulfate.

Following dilution, the reaction mixture should have the following properties in the absence of undissolved solids: an iron to titanyl dioxide ratio of about 0.5-1.2:1.0, a titanium dioxide content of about 120 to about 180 grams per liter, a specific gravity of about 1.4 to about 1.8, and an active acid to titanyl dioxide mole ratio of about 1.4-1.9:1.

The process operating conditions for conducting the digestion reaction may readily be adjusted, depending upon the concentration of the dilute sulfuric acid and the specific amount of excess titaniferous bearing material that is employed, to provide optimum process operation. To illustrate, utilizing dilute sulfuric acid of low concentration, e.g., below 40% by weight, initially requires operating the process at a lower temperature of the preferred temperature range because of the lower boiling point of the dilute sulfuric acid. It is desirable to increase the amount of titaniferous bearing material employed so as to digest as much material as possible in the first digestor reactor at which point the operating temperature and reaction rate are usually higher. As noted hereinbelow, the temperature in subsequent digestor reactors is maintained at a level lower than the first digestor reactor and, ultimately, must be reduced to preclude or avoid premature hydrolysis of the titanyl sulfate solution.

The temperature at which the digestion reaction occurs is below about 140° C. and preferably between about 55° C. and about 140° C. Selecting a temperature that is too low in a digestion reaction should be avoided because the digestion reaction will proceed too slowly and thus require increased residence time of the reactants in the digestion reactor. Also, increased residence times should be avoided to preclude the risk of undesirable nuclei formation in the reaction solution due to premature hydrolyzation of the titanium salt. A preferred operating temperature for conducting the digestion reaction is between about 70° C. and 110° C.

It should be noted that the digestion reaction of the process of the present invention may be accomplished as a batch reaction, e.g., in a reaction vessel from which the reaction mixture, after the digestion reaction has proceeded to a desired extent, is withdrawn and processed further in other vessels. A preferred embodiment of the process of the invention is where the digestion reaction is performed continuously in at least two reaction vessels and wherein the titaniferous bearing material and the dilute sulfuric acid are made to flow concurrently.

When conducted in a continuous manner, the process is preferably performed using two or more digestor reactors. The total number of digestors being dependent upon the ease of reaction control, plant output and process handling.

The preferred operating temperatures for conducting the digestion reaction in two digestor reactors or stages are wherein the first digestor is maintained below about 140° C. preferably below about 110° C. and the second digestor is maintained below about 100° C., preferably below about 75° C.

The preferred operating temperatures for conducting the digestion reaction in three digestor reactors or stages, are wherein the first digestor is maintained below about 140° C. preferably below about 110° C., the second digestor is below about 110° C. preferably below about 100° C. and the third digestor is maintained below about 80° C. preferably below about 75° C.

The preferred operating temperatures for conducting the digestion reaction in four digestor reactors or stages are wherein the first digestor is maintained below about 140° C. preferably below about 110° C., the second digestor is maintained below about 110° C. preferably below about 90° C., the third digestor is maintained below about 100° C., preferably below about 86° C. and the fourth digestor is maintained below about 90° C. preferably below about 75° C.

All of the foregoing digestor temperatures may be varied depending upon the desired yield and reaction times present in each stage.

One of the essential and salient features of the liquid phase digestion process invention in providing an operable process is that the temperature of the digestion reaction is decreased as the reaction progresses to preclude or avoid premature hydrolysis of the resulting titanyl sulfate solutions. Premature hydrolysis precludes formation of pigment grade or quality titanium dioxide.

The duration of the digestion reaction in a digestor is controlled by the optimum degree of conversion or digestion of the titaniferous bearing material at that stage. Generally speaking, it is preferred to digest or react as much of the titaniferous bearing material as is possible in the first digestor reactor or stage where the temperature is maintained at the highest level to preclude hydrolysis of the titanyl sulfate in solution. For example, in a continuous multiple stage system employing MacIntyre ore as the source of titaniferous bearing material it is sometimes possible to digest in the first stage up to about 90% by weight of the stoichiometric amount of the ore charged to the process, excluding the excess ore. Preferably, between about 30% and 80%, and most preferably between about 60% and 80% by weight of the stoichiometric amount of the ore is digested in the first stage, excluding the excess ore. Conversion is measured by the amount of reaction completed with a stoichiometric quantity of titaniferous bearing material.

Temperature is used to control the digestion reaction preferably by monitoring the ratio of active acid to titanium in the reaction solution. This ratio is an indication of the degree of conversion or digestion. The term "active acid" means the total quantity of free acid in the reaction solution plus the acid combined with the titanium in the reaction solution. The ratio of active acid to titanium dioxide (active acid:titanium dioxide) is calculated as the sum of both the free acid in solution plus the acid combined with the titanium in solution divided by the titanium in solution (calculated as $TiO_2$). For example, the active acid content of a solution may be determined by titration of a selected sample (by weighing of pipeting techniques) with a 0.5 N caustic solution (NaOH) to a pH of 4.0 in a barium chloride/ammonium chloride buffered solution. The titration yields the content of free acid plus the acid combined with the $TiO_2$ which is referred to as active acid. To illustrate, 60 mls of buffer solution containing 75 g/l of barium chloride and 250 g/l of ammonium chloride is added to the beaker containing the related sample and diluted with water to 250 mls and titrated with 0.5 N caustic to the methyl orange end-point.

In a batch process, the active acid content can vary widely and is not critical except to the extent that digestion and reduction occur in a liquid phase. In a continuous process, the active acid ratio is permitted to drop from infinity at the commencement of the reaction to between 1.50 and 7.0 at the completion of the reaction dependent upon digestion conditions. Typically, the active acid to $TiO_2$ level varies between 2.0 and 3.5. As the active acid level decreases, the stability of the titanyl sulfate solution to hydrolysis decreases. Generally, the temperature of the reaction solution should be maintained below about 140° C. and preferably below about 110° C. as the ratio of active acid to titanium (calculated as titanium dioxide) falls to about 2.0. To illustrate in a two-stage digestion process, the temperature of the reaction solution in a first stage or digestor of the digestion reaction should be maintained at a temperature below about 140° C., e.g., 110° C., until the ratio of active acid to titanium dioxide of the reaction solution falls to about 3.0, at which time the temperature of the reaction solution is reduced to below about 100° C., e.g., 70° C. In contrast, in a three stage dimension process, wherein the temperature of the first stage is maintained at about 110° C. to provide a reaction mixture having a ratio of active acid to titanium dioxide in the reaction solution in the range of between about 2.5 and about 3.0, and thereafter the reaction is conducted in a second stage at a temperature of about 100° C. to provide a reaction mixture having a ratio of active acid to titanium dioxide in the reaction solution in the range between about 2.2 and about 2.5. The reaction can then be completed in a third stage at a temperature below about 80° C. to provide a reaction mixture having a ratio of active acid to titanium dioxide in the reaction solution of about 2.0.

Upon completion of the digestion reaction, the resulting reaction mixture containing titanyl sulfate, iron sulfate and trace element from the titaniferous bearing material may be treated to recover a stable titanyl sulfate solution or processed according to conventional sulfate processing techniques to prepare titanium dioxide pigment.

Referring to the diagram depicted in the accompanying FIGURE, reference numeral 10 represents a digestion tank. Ilmenite ore is adapted to be fed into digestor tank 10 from ore storage bin 11. Dilute sulfuric acid having a concentration between about 25% and about 60% by weight, based upon the total weight of the acid solution, is adapted to be fed either from a mixture of strong acid (96% by weight) from a source 12 of fresh acid, combined with recycled spent acid (15% to 45% by weight) or water directly to digestor tank 10.

The reactants in digestor tank 10 are maintained at a temperature below about 140° C. and preferably between about 55° C. and about 140° C. More specifically, the reactants in digestor reactor 10 are preferably maintained at between about 100° C. and about 110° C. Digestor tank 10 may be maintained at any convenient pressure; atmospheric pressure is preferred for reasons of economy.

When operating the depicted two stage digestion system in a continuous manner, the reaction mixture is continuously transported from digestor tank 10 to digestor tank 15.

The reaction mixture in digestor tank 15 is preferably maintained at a temperature somewhat lower than the temperature in digestor tank 10. For example, the reaction mixture in digestor tank 15 is maintained at between about 75° C. and about 100° C. Control of the temperature in digestor tank 15 may be achieved by the addition of water, recycled titanyl sulfate solution, or mixtures thereof by means of conduit 34. The pressure in digestor tank 15 is preferably atmospheric, but higher pressures may be utilized if desired.

A suitable reductant such as, for example, iron or titanous sulfate, from container 22 may be added to digestor tank 10 and/or digestor tank 15. Also, each digestor tank should be equipped with suitable agitation means, indicated by reference numeral 9 to maintain the reactants and the reaction solution well agitated.

The reaction mixture from digestor tank 15 is continuously fed to a suitable separator device 19, e.g., a gravity separator (or multiples thereof in series and/or parallel flow arrangement), in which the coarse unreacted ilmenite ore is separated from the liquid reaction mixture. The unreacted ilmenite is optionally recycled by way of conduit 21 to digestor reactor 10. The liquid reaction product from separator device 19 is conveyed to settler device 20, such as a conventional settler device in which gangue or other undesirable solid material is removed from the reaction product.

Alternatively, the reaction mixture from digestor tank 15 or the liquid reaction product from separator device 10 may be mixed with water, recycled titanyl sulfate solution, or mixtures thereof from conduits 36 and 38, respectively, to solubilize any ferrous sulfate monohydrate precipitate.

The resulting solution containing titanyl sulfate, iron sulfate and trace elements from the ilmenite ore may be recovered and processed to prepare stable titanyl sulfate solution. Alternatively, the solution may be processed to prepare titanium dioxide pigment wherein the reaction solution is then conducted to a settler device 20 and from settler device 20 to a crystallizer device 23 wherein the copper as (i.e., ferrous sulfate heptahydrate) is crystallized and removed by known process measures. The reaction solution may be clarified either before or after crystallization following removal of the ferrous sulfate heptahydrate. A clarification step prior to crystallization is favorable if it is desired to obtain a ferrous sulfate heptahydrate of high purity which may be processed further, e.g., for producing reagents which will be employed for the purification of water and sewage.

For example, during crystallization, the solution is cooled in a continuous or batch vacuum crystallizer to about 10° C. to 20° C. by pulling a vacuum of 20 inches of mercury to form large crystals of copperas ($FeSO_4 \cdot 7H_2O$) which can easily be filtered on a drum or table filter. The cake of copperas may be washed to recover the soluble titanium values.

After removing the ferrous sulfate heptahydrate and if necessary, clarifying and fine filtrating, a titanyl sulfate reaction solution is obtained having a favorable ratio of Fe:$TiO_2$.

A portion of the reaction solution is transported to mixing tank 30 through conduit 31 to provide a titanyl sulfate solution for recycling. The titanyl sulfate solution may be mixed with water from a source 20 in mixing tank 30. The titanyl sulfate solution, water, or mixtures thereof are fed to the process through conduits 34, 36, or 38 to dissolve precipitated ferrous sulfate monohydrate. The remaining titanyl sulfate reaction solution can be directly hydrolyzed or, optionally, evaporated by known means in a vacuum evaporator to the desired $TiO_2$ concentration, followed by hydrolysis.

The reaction solution from crystallizer 23 consists of a titanyl sulfate ($TiOSO_4$) solution which is fed into hydrolyzer device 24 wherein the titanyl sulfate is hydrolyzed by known process measures to provide titanium dioxide hydrate. One such process is disclosed in U.S. Pat. Nos. 1,851,487 and 3,071,439.

Following hydrolysis the titanium dioxide hydrate is filtered by a filtering device 25, e.g., a Moore filter, and the resulting filter cake is fed into calciner 26 wherein it is heated in a known manner to remove water of hydration and adsorbed sulfuric acid to provide titanium dioxide suitable for pigment grade material. The spent acid resulting from the digestion, crystallization and hydrolysis steps of the process may be reprocessed or recycled for use in conducting the digestion reaction with ilmenite ore.

The principle and practice of the present invention is illustrated in the following examples which are exemplary only and it is not intended that the invention be limited thereto since modifications in technique and operation will be apparent to anyone skilled in the art. All parts and percentages specified herein are by weight and conversions are measured by the amount of reaction undergone by a stoichiometric quantity of ilmenite ore unless otherwise indicated.

EXAMPLE 1

5,882 grams of a digestion reaction mixture having a temperature of 50° C. was combined in an eight liter pyrex jar containing a teflon agitator with 4,284 grams of a recycled titanyl sulfate solution having a temperature of 40° C. The contents of the jar were heated to 68° C. and held at this temperature for three hours while maintaining constant agitation. Analysis of the digestion reaction mixture, recycled solution, and the combined mixture are presented in Table I.

TABLE I

|  | Digestion Reaction Mixture | Recycled Solution | Combined Mixture |
|---|---|---|---|
| Specific Gravity | 1.961 @ 57° C. | 1.428 @ 40° C. | 1.650 @ 68° C. |
| Specific Gravity (after filtration) | 1.700 @ 50° C. | — | 1.580 @ 50° C. |

TABLE I-continued

|  | Digestion Reaction Mixture | Recycled Solution | Combined Mixture |
|---|---|---|---|
| % $TiO_2$ | 11.6 | 11.47 | 11.02 |
| % $FeSO_4$ (soluble) | 20.4 | 9.10 | 17.43 |
| % $H_2SO_4$ | 20.8 | 20.22 | 20.61 |
| % Gangue Solids | 14.2 | — | 6.8 |
| % $TiO_2$ in Solids | 45.8 | — | 44.2 |
| % Fe in Solids | 33.4 | — | 31.7 |
| Total $FeSO_4$ (soluble & suspended) | 34.8 | 9.10 | 21.16 |

From the analysis in Table I, the digestion reaction mixture contained 14.5% suspended insoluble ferrous sulfate. The analysis of the combined mixture after three hours at 68° C. indicates it contained only 3.7% suspended insoluble ferrous sulfate following addition of the recycled titanyl sulfate solution to the reaction mixture forming a stable titanyl sulfate solution.

EXAMPLE 2

110 gallons of a digestion reaction mixture having a temperature of about 54° C. was combined in an agitated 250 gallon polypropylene lined tank with 110 gallons of a recycled titanyl sulfate solution having a temperature of about 32° C. The combined mixture was heated to 57° C. under constant agitation and maintained for 1.5 hours. The analyses of the digestion reaction mixture, recycled solution, and combined mixture are presented in Table II.

TABLE II

|  | Digestion Reaction Mixture | Recycled Solution | Combined Mixture |
|---|---|---|---|
| Specific Gravity | 1.810 @ 130° F. | 1.424 @ 90° F. | 1.633 @ 135° F. |
| % $FeSO_4$ (soluble) | 20.58 | 9.15 | 19.07 |
| % $FeSO_4 \cdot H_2O$ | 10.75 | — | 1.13 |
| % $TiO_2$ | 11.82 | 11.63 | 11.25 |
| % Gangue Solids | 7.24 | — | 2.94 |

From the analyses in Table II, the digestion reaction mixture contained 10.75% suspended insoluble ferrous sulfate monohydrate. The analysis of the combined mixture after 1.5 hours at 57° C. shows it contained only 1.13% suspended insoluble ferrous sulfate monohydrate and was a stable titanyl sulfate solution.

EXAMPLE 3

2284 grams of a digestion reaction mixture at about 51° C. was combined with 777 grams of water at ambient temperature in a 4 liter pyrex beaker equipped with a teflon agitator. The combined mixture was heated to about 50° under constant agitation and maintained for one hour. The analyses of the digestion reaction mixture and combined mixture are presented in Table III.

TABLE III

|  | Digestion Reaction Mixture | Combined Mixture |
|---|---|---|
| Specific Gravity | 1.727 | 1.480 |
| Specific Gravity (after filtration) | 1.615 | 1.455 |
| % $TiO_2$ | 8.91 | 6.8 |
| % $FeSO_4$ (soluble) | 21.7 | 21.0 |
| % $H_2SO_4$ | 18.9 | — |
| % Gangue Solids | 3.77 | — |
| Total $FeSO_4$ | 29.5 | 21.0 |

TABLE III-continued

|  | Digestion Reaction Mixture | Combined Mixture |
|---|---|---|
| (soluble & suspended) | | |
| % FeSO$_4$ . H$_2$O | 7.7 | 0.0 |

From the analyses in Table III, the digestion reaction mixture contained 7.7% suspended insoluble ferrous sulfate monohydrate. The analyses of the combined mixture shows it contained no suspended ferrous sulfate monohydrate and was a stable titanyl sulfate solution.

EXAMPLE 4

3187 grams of a digestion reaction mixture at about 57° C. was combined with 254 grams of water at ambient temperatures in a 4 liter pyrex beaker equipped with a teflon agitator. The combined mixture was heated to about 50° C. under constant agitation and maintained for one hour. The analyses of the digestion reaction mixture and combined mixture are presented in Table IV.

TABLE IV

|  | Digestion Reaction Mixture | Combined Mixture |
|---|---|---|
| Specific Gravity | 1.727 | 1.620 |
| Specific Gravity (after filtration) | 1.615 | 1.515 |
| % TiO$_2$ | 8.91 | 7.76 |
| % FeSO$_4$ (soluble) | 21.7 | 19.53 |
| % H$_2$SO$_4$ | 18.9 | — |
| % Gangue Solids | 3.77 | — |
| % Total FeSO$_4$ (soluble & suspended) | 29.5 | 24.75 |
| % FeSO$_4$ . H$_2$O | 7.7 | 2.9 |

From the analyses in Table IV, the digestion reaction mixture contained 7.7% suspended insoluble ferrous sulfate monohydrate. The analysis of the combined mixture shows it contained only 2.9% suspended ferrous sulfate monohydrate and was a stable titanyl sulfate solution.

EXAMPLE 5

4149 grams of a digestion reaction mixture having a temperature of 61° C. was combined in an agitated 8 liter pyrex jar with 319 grams of water at ambient temperatures, and 1207 grams of a recycled titanyl sulfate solution having a temperature of 38° C. The combined mixture was heated to 50° C. under constant agitation and maintained for one hour. The analyses of the digestion reaction mixture, recycled solution, and combined mixture are presented in Table V.

TABLE V

|  | Digestion Reaction Mixture | Recycled Solution | Combined Mixture |
|---|---|---|---|
| Specific Gravity | 1.655 | 1.450 | — |
| Specific Gravity (after filtration) | 1.600 | — | — |
| % TiO$_2$ | 8.8 | 10.6 | 8.79 |
| % FeSO$_4$ (soluble) | 21.2 | 9.7 | 17.71 |
| % H$_2$SO$_4$ | 19.05 | 21.2 | — |
| % Gangue Solids | 3.37 | — | — |
| % Total FeSO$_4$ (soluble & suspended) | 25.6 | 9.7 | 18.90 |
| % FeSO$_4$ H$_2$O | 7.3 | — | 1.3 |

From the analyses in Table V, the digestion reaction mixture contained 7.3% suspended insoluble ferrous sulfate monohydrate. The analyses of the combined mixture after one hour at 50° C. shows it contained only 1.3% suspended insoluble ferrous sulfate monohydrate and was a stable titanyl sulfate solution.

EXAMPLE 6

1919 grams of a digestion reaction mixture at 52° C. was combined in an agitated 4 liter pyrex beaker with 339 grams of water at ambient temperature, and 1330 grams of a titanyl sulfate solution having a temperature of 42° C. The combined mixture was heated to 50° C. under constant agitation and maintained for one hour. The analyses of the digestion reacton mixture, recycled solution, and combined mixture are presented in Table VI.

TABLE VI

|  | Digestion Reaction Mixture | Recycled Solution | Combined Mixture |
|---|---|---|---|
| Specific Gravity | 1.704 | 1.425 | — |
| Specific Gravity (after filtration) | 1.625 | — | — |
| % TiO$_2$ | 9.16 | 10.67 | 8.75 |
| % FeSO$_4$ (soluble) | 22.0 | 9.72 | 18.21 |
| % H$_2$SO$_4$ | 20.6 | 20.3 | — |
| % Gangue Solids | 2.37 | — | — |
| % Total FeSO$_4$ (soluble & suspended) | 28.9 | 9.72 | 18.38 |
| % FeSO$_4$ . H$_2$O | 7.1 | — | 1.6 |

From the analyses in Table VI the digestion reacton mixture contained 7.1% suspended insoluble ferrous sulfate monohydrate. The analyses of the combined mixture after one hour at 50° C. shows it contained only 1.6% suspended insoluble ferrous sulfate monohydrate. The resulting combined mixture was a stable titanyl sulfate solution suitable for preparing titanium dioxide pigment.

The invention being thus described, it will be obvious that the same may be varied in many ways. Such variations are not to be regarded as a departure from the spirit and scope of the invention, and all such modifications are intended to be included within the scope of the following claims.

We claim:

1. A process for preparing a stable titanyl sulfate solution, which comprises:
    (1) reacting a titaniferous bearing material in an amount between about 10% and about 400% above the stoichiometric amount of material necessary to react with sulfuric acid to provide titanyl sulfate with a dilute sulfuric acid solution having a concentration between about 25% and about 60% by weight, based upon the total weight of said solution, at a temperature below about 140° C.;
    (2) cooling the resulting reaction mixture to a temperature below about 110° C. without precipitating the titanyl sulfate to produce a reaction mixture containing dissolved titanyl sulfate;
    (3) diluting the reaction mixture containing titanyl sulfate with a sufficient amount of a diluent material selected from the group consisting of water, titanyl sulfate solution, and mixtures thereof, to produce a reaction mixture having the following properties in the absence of undissolved solids: an iron to titanium dioxide weight ratio of about 0.5–1.2:1.0, a titanium dioxide content of about 120 to about 180 grams per liter, a specific gravity of about 1.4 to about 1.8, and an active sulfuric acid to titanium dioxide mole ratio of about 1.4–1.9:1;

(4) separating undissolved solids and obtaining a stable titanyl sulfate solution.

2. The process of claim 1 wherein the diluent is a titanyl sulfate solution having a weight ratio of iron to titanium dioxide of less than 0.4:1.0.

3. The process of claim 1 wherein the dilution is performed prior to separating the undissolved solids.

4. The process of claim 1 wherein dilution is performed by using said diluent materials at a temperature less than the temperature of the reaction mixture to inhibit hydrolytic nucleation of titanyl sulfate present in the reaction mixture.

5. A process for producing titanium dioxide from a titanyl sulfate solution, which comprises:
 (1) reacting a titaniferous bearing material in an amount between about 10% and about 400% above the stoichiometric amount of titaniferous bearing material necessary to react with sulfuric acid to provide titanyl sulfate with a dilute sulfuric acid solution having a concentraton between about 25% and about 60% by weight, based upon the total weight of said solution, at a temperature below about 140° C.;
 (2) cooling the resulting reaction mixture to a temperature below about 110° C. without precipitating titanyl sulfate to produce a reaction mixture containing dissolved titanyl sulfate;
 (3) diluting the reaction mixture containing titanyl sulfate with a sufficient amount of a diluent material selected from the group consisting of water, titanyl sulfate solution, and mixtures thereof to produce a reaction mixture having the following properties in the absence of undissolved solids, an iron to titanium dioxide weight ratio of about 0.7–1.1:1.0, a titanium dioxide content of about 120 to about 180 grams per liter, a specific gravity of about 1.4 to about 1.8, and an active sulfuric acid to titanium dioxide mole ratio of about 1.4–1.9:1.0;
 (4) separating undissolved solids from the reaction mixture to provide a solution of iron sulfate and titanyl sulfate;
 (5) removing iron sulfate from said solution of iron sulfate and titanyl sulfate to produce a solution of titanyl sulfate;
 (6) hydrolyzing said titanyl sulfate to provide a titanium dioxide hydrate, and spent sulfuric acid solution;
 (7) calcining said titanium dioxide hydrate to provide titanium dioxide; and
 (8) recovering titanium dioxide.

6. The process of claim 5 wherein the titanyl sulfate solution employed for diluting the reaction mixture is a titanyl sulfate solution recovered after removing ferrous sulfate but prior to hydrolyzing said titanyl sulfate solution, said diluent having a weight ratio of iron to titanium dioxide less than 0.4:1.0.

7. The process of claim 5 wherein the dilution is performed prior to separating the undissolved solids.

8. The process of claim 5 wherein the dilution is performed by using said diluent materials at a temperature less than the temperature of the reaction mixture to inhibit hydrolytic nucleation of the titanyl sulfate present in the reaction mixture.

* * * * *